(12) United States Patent
Barnum

(10) Patent No.: US 8,971,634 B2
(45) Date of Patent: Mar. 3, 2015

(54) APPROXIMATE PYRAMIDAL SEARCH FOR FAST DISPLACEMENT MATCHING

(71) Applicant: Texas Instruments Incorporated, Dallas, TX (US)

(72) Inventor: Peter Charles Barnum, Berkeley, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 14/064,126

(22) Filed: Oct. 26, 2013

(65) Prior Publication Data

US 2014/0119663 A1    May 1, 2014

Related U.S. Application Data

(60) Provisional application No. 61/718,851, filed on Oct. 26, 2012.

(51) Int. Cl.
*G06K 9/46* (2006.01)
*G06K 9/62* (2006.01)
*G06T 7/20* (2006.01)

(52) U.S. Cl.
CPC ............ *G06K 9/6215* (2013.01); *G06T 7/2013* (2013.01); *G06T 7/2073* (2013.01); *G06T 2207/20016* (2013.01)
USPC ....................................................... 382/192

(58) Field of Classification Search
CPC ....... H04N 19/51; H04N 19/56; H04N 1/195; H04N 2201/0414; H04N 19/61; H04N 5/145; H04N 5/2258; G06T 7/2033; G06T 2207/20021; G06T 2207/10016; G06T 7/2013; G06T 7/2073; G06T 2207/20016; G06K 9/62; G06K 9/6215
USPC .......................................... 382/181, 191, 208
See application file for complete search history.

(56) References Cited

U.S. PATENT DOCUMENTS

2006/0280248 A1* 12/2006 Kim et al. ................. 375/240.16
2009/0060280 A1* 3/2009 Choi et al. .................... 382/106

(Continued)

OTHER PUBLICATIONS

Jingdan Zhang et al, "Pyramidal Search of Maximum Coherence Direction for Biomedical Image Interpolation", 2002 IEEE International Symposium on Biomedical Imaging, pp. 887-890, Jul. 7-10, 2002, Washington, DC.

(Continued)

*Primary Examiner* — Edward Park
(74) *Attorney, Agent, or Firm* — Mima Abyad; Frederick J. Telecky, Jr.

(57) ABSTRACT

A method for approximate pyramidal search for displacement matching is provided that includes performing a complete window-based search at a coarsest resolution level in a resolution pyramid to determine a best matching point in a destination image for each point in a source image, wherein a displacement from each point to the best matching point is determined, counting, for each displacement of the determined displacements, a number of points having the displacement, selecting displacements from the determined displacements based on the number of points counted for each displacement and a predetermined threshold, and performing a search at the next finer resolution level in the resolution pyramid to determine a best matching point in the destination image for each point in the source image, wherein the search for a best matching point for each point is limited to the selected displacements and a reduced search window around each displacement.

12 Claims, 4 Drawing Sheets

(56) References Cited

U.S. PATENT DOCUMENTS

2009/0161946 A1* 6/2009 Sato et al. .................. 382/154
2009/0324016 A1* 12/2009 Ikeda et al. ................. 382/103
2010/0128974 A1* 5/2010 Koizumi et al. ............ 382/154

OTHER PUBLICATIONS

Ted Camus, "Real-Time Quantized Optical Flow", Journal of Real-Time Imaging, vol. 3, No. 2, pp. 71-86, Apr. 1997.

* cited by examiner

`US 8,971,634 B2`

APPROXIMATE PYRAMIDAL SEARCH FOR FAST DISPLACEMENT MATCHING

CROSS-REFERENCE TO RELATED APPLICATIONS

This application claims benefit of U.S. Provisional Patent Application Ser. No. 61/718,851, filed Oct. 26, 2012, which is incorporated herein by reference in its entirety.

BACKGROUND OF THE INVENTION

1. Field of the Invention

Embodiments of the present invention generally relate to an approximate pyramidal search for fast displacement matching between images.

2. Description of the Related Art

Searching for the best matching patch between two arrays of image data is a common problem in image processing. For example, many stereoscopic imaging systems compute the disparity between left and right images by finding a two-dimensional (2D) patch in the right image that best matches a given 2D patch in the left image. In another example, the alignment of two three-dimensional (3D) point clouds may be accomplished by searching for the best 3D patch matches between the volumes. In another example, video compression algorithms may determine motion between two consecutive images using an optical flow algorithm that matches patches between the two images.

A coarse-to-fine resolution pyramid approach is often used for such matching. In general, in a pyramid approach, an initial search is performed at a lower resolution than the original images and the search result is refined at one or more higher resolutions. The number of resolution levels in the search pyramid is implementation dependent. The use of a pyramidal search approach has been shown to be faster and more tolerant to local minima that an exhaustive search at high resolution.

SUMMARY

Embodiments of the present invention relate to methods, apparatus, and computer readable media for approximate pyramidal search. In one aspect, a method for approximate pyramidal search for displacement matching is provided that includes receiving a source image and a destination image, performing a complete window-based search at a coarsest resolution level in a resolution pyramid to determine a best matching point in the destination image for each point in the source image, wherein a displacement from each point to the best matching point is determined, counting, for each displacement of the determined displacements, a number of points having the displacement, selecting displacements from the determined displacements based on the number of points counted for each displacement and a predetermined threshold, and performing a search at the next finer resolution level in the resolution pyramid to determine a best matching point in the destination image for each point in the source image, wherein the search for a best matching point for each point is limited to the selected displacements and a reduced search window around each displacement, wherein the selected displacements are upsampled to the next finer resolution level.

In one aspect, an apparatus configured to perform approximate pyramidal search for displacement matching is provided that includes means for receiving a source image and a destination image, means for performing a complete window-based search at a coarsest resolution level in a resolution pyramid to determine a best matching point in the destination image for each point in the source image, wherein a displacement from each point to the best matching point is determined, means for counting, for each displacement of the determined displacements, a number of points having the displacement, means for selecting displacements from the determined displacements based on the number of points counted for each displacement and a predetermined threshold, and means for performing a search at the next finer resolution level in the resolution pyramid to determine a best matching point in the destination image for each point in the source image, wherein the search for a best matching point for each point is limited to the selected displacements and a reduced search window around each displacement, wherein the selected displacements are upsampled to the next finer resolution level.

In one aspect, a non-transitory computer readable medium storing software instructions is provided. The software instructions, when executed by at least one processor, cause the performance of a method for approximate pyramidal search for displacement matching that includes receiving a source image and a destination image, performing a complete window-based search at a coarsest resolution level in a resolution pyramid to determine a best matching point in the destination image for each point in the source image, wherein a displacement from each point to the best matching point is determined, counting, for each displacement of the determined displacements, a number of points having the displacement, selecting displacements from the determined displacements based on the number of points counted for each displacement and a predetermined threshold, and performing a search at the next finer resolution level in the resolution pyramid to determine a best matching point in the destination image for each point in the source image, wherein the search for a best matching point for each point is limited to the selected displacements and a reduced search window around each displacement, wherein the selected displacements are upsampled to the next finer resolution level.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
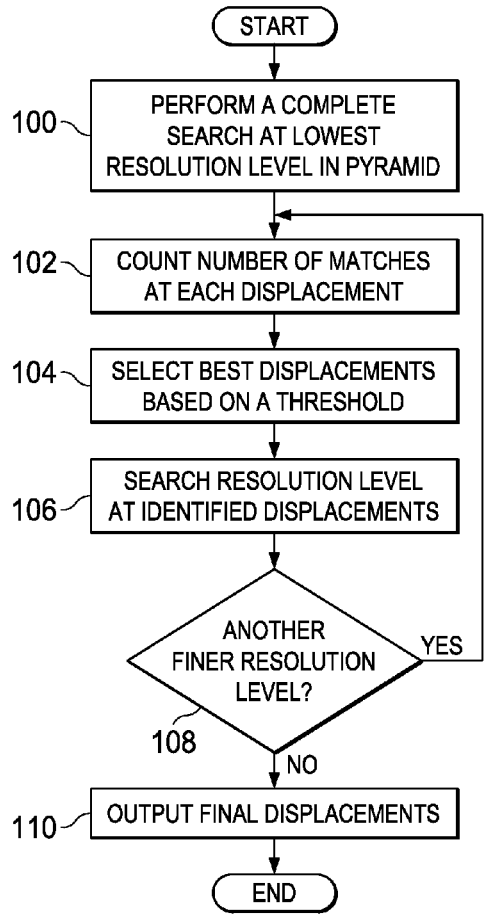
FIG. 1 is a flow diagram of a method for approximate pyramidal search.

Specific embodiments of the invention will now be described in detail with reference to the accompanying figures. Like elements in the various figures are denoted by like reference numerals for consistency.

As previously mentioned, pyramid searches at two or more levels of resolution are commonly used for matching in image processing, e.g., for determining displacement of objects between two images. Embodiments of the invention provide for an accelerated pyramid search in which the number of displacements searched at each resolution level in the pyramid except the lowest resolution level is selected based on a threshold, e.g., an energy threshold, tied to a voting scheme. More specifically, in an embodiment, a complete matching search is performed at the lowest (coarsest) resolution in the pyramid to identify displacements with the best matches between two images downsampled to the lowest resolution. The best matches at each displacement are then counted and an ordered set of displacements (from highest match count to lowest) is generated. This ordered set is then pruned based on an energy threshold to form a set of displacements to be searched at the next level of resolution. The search at the next level of image resolution is then limited to the identified set of displacements and the search range may be smaller than that used at the coarser resolution level. The process of generating an ordered set of displacements, pruning the set, and searching based on the pruned set at the next level of resolution is repeated until all resolution levels in the pyramid have been processed. As compared to using prior art coarse-to-fine pyramid search techniques, the accelerated pyramid search is even faster and has fewer issues with local minima and noise.

FIG. 1 is a flow diagram of a method for approximate pyramidal search. The input to the method may be two arrays of image data of the same dimensionality, e.g., two-dimensional (2D), three dimensional (3D), or N dimensional (ND) where N is a positive integer. The method performs a window-based matching search, computing the best match for a set of points (pixels), between the two images. Any suitable window-based search technique may be used. An example of one search technique that may be used is described in T. Camus, "Real-Time Quantized Optical Flow," Journal of Real-Time Imaging, Vol. 3, pp. 71-86, 1997.

Figure 2A:
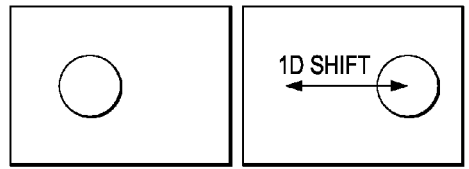
FIGS. 2A-2C, 3A-3D, and 4A-4D are examples.
Figure 2B:
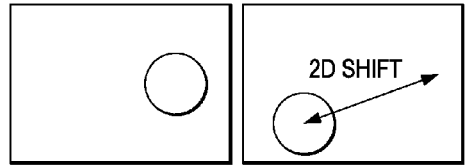
Figure 2C:
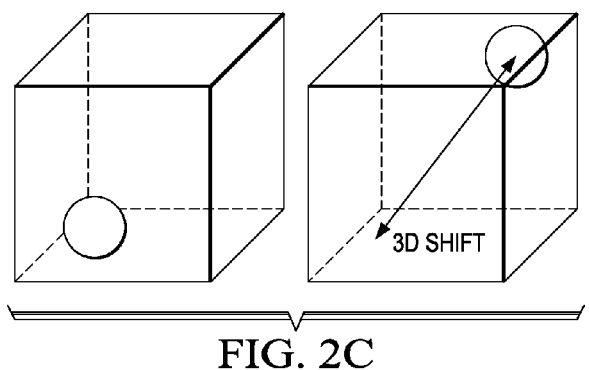

The search dimensionality may be any suitable dimensionality but is expected to be less-than-or-equal to the dimensionality of the images. For example, for a stereoscopic image (corresponding left and right images), a one-dimensional (1D) search in the corresponding 2D images may be performed. In another example, a 2D search in consecutive 2D images is performed for optical flow. FIGS. 2A, 2B, and 2C show, respectively, examples of search windows for a 1D search in a 2D image array, a 2D search in a 2D image array, and a 3D search in a 3D image array. Any suitable number of resolution levels may be used in the search pyramid but the number is expected to be at least two, the original resolution and a lower (coarser) resolution. Further, any suitable window dimensions (search range) may be used and may be implementation dependent.

Referring again to FIG. 1, for the sake of simplicity, the method is explained using a 1D search in a pair of 2D images as an example. One of ordinary skill in the art, having benefit of this description, will understand embodiments in which the dimensionality of the search window and/or the image arrays is different.

Initially, a complete search is performed 100 at the lowest (coarsest) image resolution level in the pyramid. A complete search is a search in which for each point (pixel), every displacement within a range is checked, where the range dictates the bounds of the search window. The particular range used is application dependent. For example, images captured by a camera in an automobile might be searched for all displacements between −100 and 100 pixels both horizontally and vertically. To perform the search, the two input images are downsampled to this lowest resolution level. Based on the search range, the best match for each point in one image (the source image) is found in the other image (the destination image). The search may be, for example, exhaustive or iterative, and results in a best displacement at each point. Any suitable window-based search technique may be used. To find matches between the two images, a 1D window around the source and destination points in the images is used. Further, the matches may be evaluated using simple summing criteria such as Sum of Absolute Differences (SAD) or Sum of Squared Differences (SSD).

Note that the search range may be specified for the lowest image resolution or the for the input image resolution. If the search range is specified for the input image resolution, the search range is also downsampled by the same factor as the input images. For example, if the search range for the original input images is −50 to 50, at half the original resolution, the range would be −25 to 25, and at one quarter of the resolution, the range would be −13 to 13.

Once best displacements into the destination image are found for each point in the source image, the number of matches at each displacement is counted 102, i.e., the number of source points at which the best match was found in the destination image at a given displacement is counted. For example, some points may have a displacement of 1, some points may have a displacement of 2, some points may have a displacement of 3, etc. It is expected that many points will be clustered at a few displacements. The displacement values may be considered an ordered set arranged from highest point count to lowest.

A list of the "best" displacements is then selected 104 from this ordered set based on a predetermined threshold. In some embodiments, the threshold is an energy threshold conceptually similar to the compression ratio of a lossy-compressed image. The "energy" in this case is the percentage of the points that have the top Z displacements. For example, assume 10 points have displacement 1, 5 points have displacement 2, and 1 point has displacement 3. The top displacement, i.e., 1, has $10/(10+5+1)=63\%$ of the energy. The top two displacements, i.e., 1 and 2, have $(10+5)/(10+5+1)=94\%$ of the energy. All displacements have $(10+5+1)/(10+5+1)=100\%$ of the energy. The energy threshold may be set as a percentage M to indicate that the top N displacements are to be selected, such that the top N encompass M percent of the energy. Continuing the previous example, if 95% of the energy is desired, the top two displacements would be selected. Note that using the energy threshold that keeps a percentage of the displacements leads to a non-deterministic runtime. In some embodiments in which a deterministic runtime is desired, the threshold may be set to keep an integer number of the top displacements.

The images are then searched 106 at the next higher (finer) resolution in the pyramid using the list of selected displacements. To perform the search, the two input images may be downsampled to the desired resolution level or the downsampled images previously searched may be upsampled to the next resolution level. Rather than performing a complete search, the search for each point in the source image is performed only at each of the selected displacements (upsampled by the same factor as the images) in the destination image. Further, the search window is reduced to a small range around these displacements. The size of this search range is implementation dependent, and may be, for example, 1 point in each direction. For example, assume displacements 1 and 5 were selected from the search at the lower resolution level. At the next level, the resolution is doubled, so these displacements are 2 and 10 for the level. Assuming a search of one point in each direction, for a given point in the source image, the points in the destination image at displacements 1, 2, 3 and 9, 10, 11 are searched for the best match.

If the current resolution is the final resolution level, then the best displacements identified by the search are output 110 as the final displacements. Otherwise, the search process is repeated at the next finer resolution level. An application may receive the final displacements and use them as needed. For example, the application may rely on motion estimation. The displacements may be used to determine motion between two images. For example, a gesture recognizer may need to know how a person's hand has moved between frames. Other example applications include person/vehicle/object tracking, structure-from-motion, image-mosaicing, visual odometry, image stabilization, camera-array alignment, auto-calibration, super-resolution, noise suppression, and segmentation.

Using the best displacement list to refine the searches at higher levels of resolution is beneficial for at least two reasons. First, erroneous best-displacement estimates are likely to correspond to rare displacements that will have a low point count and will be eliminated by the threshold. Thus, such likely-erroneous matches will not be searched at the next resolution level.

Second, checking the same displacements for every point allows for significant speed increases when a summing matching metric such as SAD or SDD is used. To find matches between the two images, a window around the source and destination location is used. The window dimensionality will be less-than-or-equal to the image dimensionality. Naively, matching two ND windows requires computation of order $O(m^N)$, for an image with m elements. But when the matching metric is a simple sum such SAD or SSD, the matching can be performed in $O(m)$, assuming that matches are searched for each point in the source image.

Some example results of using an embodiment of the above method are shown in FIGS. 3A-3D and FIGS. 4A-4D. The method embodiment used a sliding-window SAD search and was incorporated in an optical flow algorithm. Tests have shown that using the accelerated pyramid search method increased computation speed significantly while removing many erroneous displacement matches.

Figure 3B:
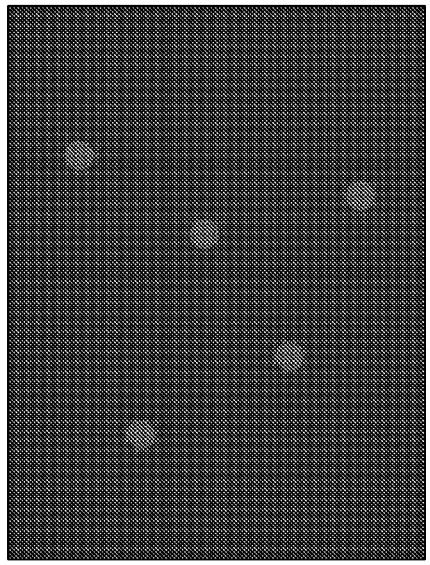
Figure 3D:
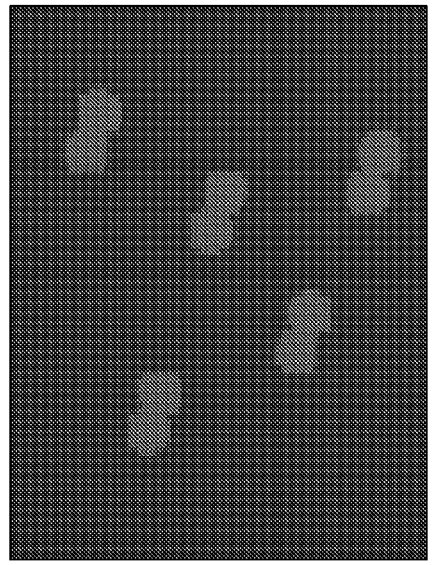
Figure 3A:
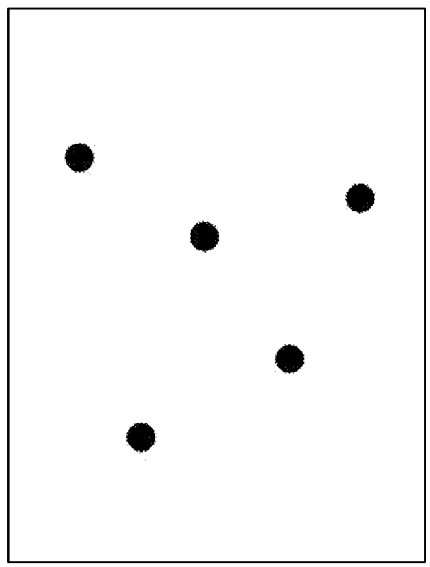
Figure 3C:
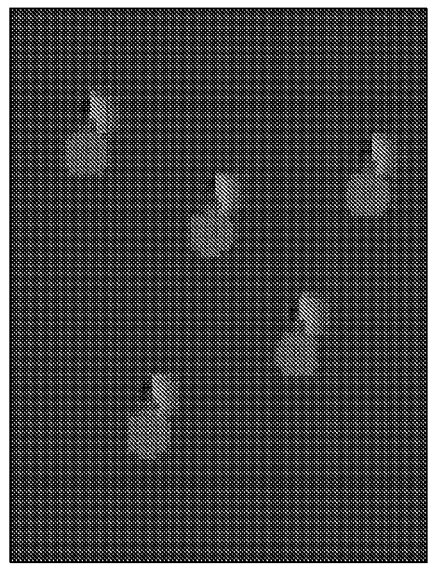

FIGS. 3A-3D are a synthetic optical flow example in which the dots are moving up and to the right. FIG. 3A shows the input image and FIG. 3B shows the ground truth flow. The light gray circles correspond to pixels that have moved as compared to FIG. 3A and the darker areas correspond to pixels that have not moved. FIG. 3C shows the result of using an exhaustive search and FIG. 3D shows the result of using the approximate pyramid search method in which the energy threshold was set to retain 0.75% of the displacements (99.25% of the displacements are rejected). The use of the approximate pyramid search exhibited a 133× speed improvement over the exhaustive search while reducing noise. Note the "shadows" to the lower right of each circle in the computed flows of FIGS. 3C and 3D are due to occlusion ambiguities, and are unrelated to the method. These "shadows" may be filtered out in post-processing.

Figure 4A:
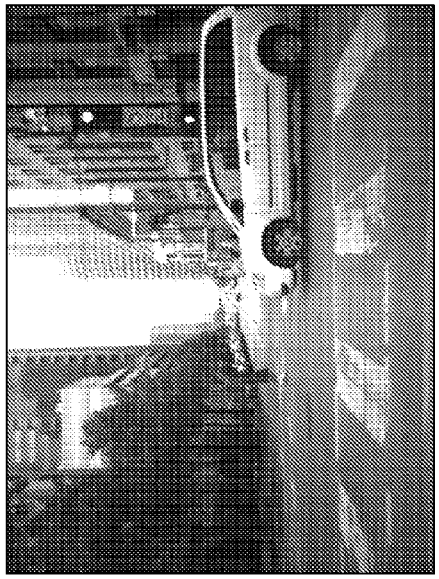
Figure 4B:
Figure 4C:
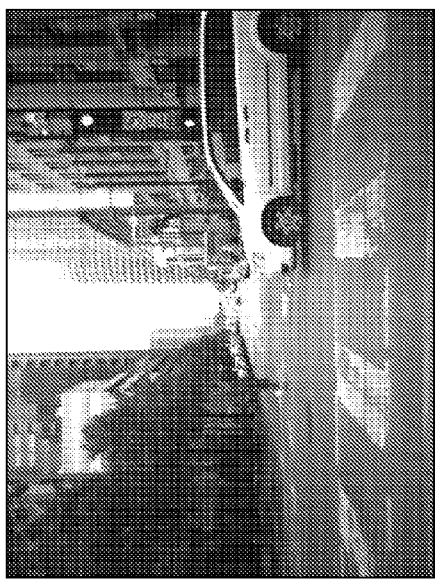
Figure 4D:

FIGS. 4A-4D are an optical flow example using actual images. FIGS. 4A and 4B show the input source and destination images. The captured scene is mostly stationary except that the pedestrian is moving right and the car is moving left. FIG. 4C shows the result of using an exhaustive search and FIG. 4D shows the result of using the approximate pyramid search method in which the energy threshold was set to retain 2.9% of the displacements. The use of the approximate pyramid search exhibited a 34× speed improvement over the exhaustive search while reducing noise. In the FIGS. 4C and 4D, the shades of gray indicate the direction of the best match. Pixels moving right are a different shade than pixels moving left. Further, the closer the direction of the movement, the more similar the gray shades will be.

Figure 5:
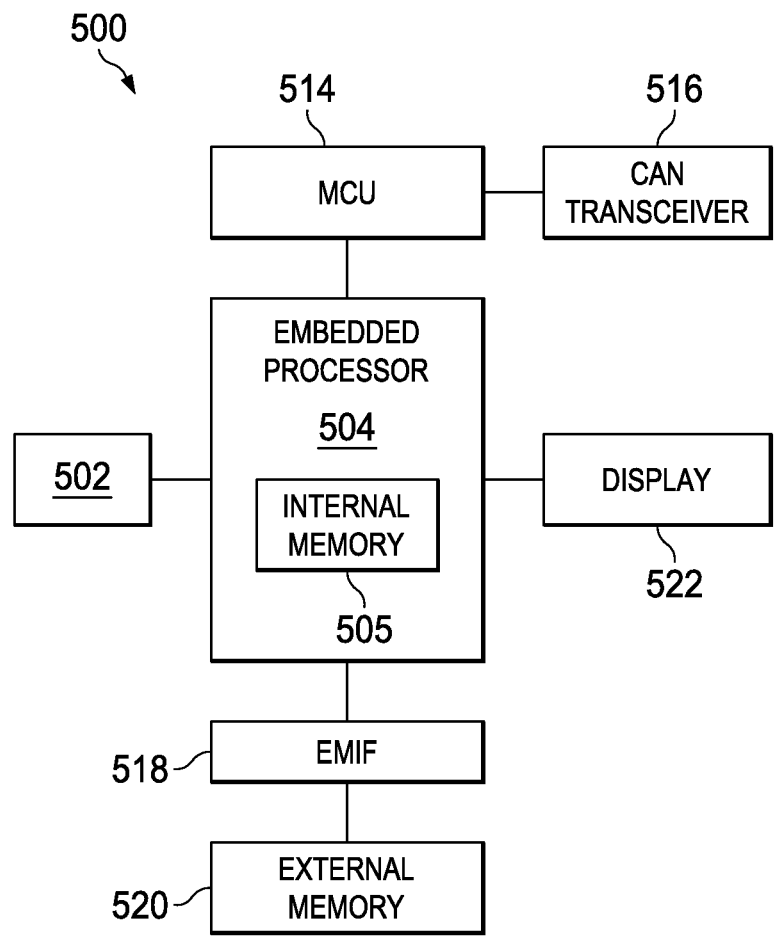
FIG. 5 is a block diagram of an automotive vision control system.

Embodiments of the method of FIG. 1 may be implemented for virtually any type of digital system with functionality to capture image and/or to receive images from other devices over a network (e.g., a desk top computer, a laptop computer, a tablet computing device, a netbook computer, a handheld device such as a mobile (i.e., cellular) phone, a personal digital assistant, a digital camera, an embedded system, etc.). FIG. 5 is a block diagram of an example digital system that may be configured to perform an embodiment of the method of FIG. 1. More specifically, FIG. 5 is a block diagram of an embedded automotive vision control system 500 suitable for use in a vehicle.

The imaging system 502 is configured to capture images of a scene and may include, for example an imaging sensor system (lens assembly, lens actuator, and imaging sensor), circuitry for converting analog image signals to digital image signals, and circuitry for controlling various aspects of the operation of the imaging system 502, such as, for example, aperture opening amount, exposure time, etc.

Software instructions implementing some or all the functionality of the method of FIG. 1 may be stored in the external memory 520 and executed by the embedded processor 504 to search images received from the imaging system 502. Software instructions implementing a driver assistance application such as forward collision warning, visual parking, and/or navigation assistance, automatic braking control, etc., may also be stored in the external memory 520 and executed on the embedded processor 504. The software instructions may be initially stored in a computer readable medium and loaded and executed by the embedded processor 504. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, random access memory, or a combination thereof.

The embedded processor 504 may be any suitable processor that provides the needed computation performance, such as, for example, a digital signal processor or a general purpose processor. The internal memory 505 may be any suitable memory design, e.g., static random access memory (SRAM). The embedded processor 504 is coupled to external memory 520 via an external memory interface (EMIF) 518. The embedded processor 504 included functionality to move instructions and/or data between the external memory 520 and the internal memory 505 via the EMIF 518 as needed for image processing and application processing.

The external memory 520 may be any suitable memory design may be used. For example, the external memory 520 may include DRAM such as synchronous DRAM (SDRAM) or double data rate DRAM (DDR DRAM), flash memory, a combination thereof, or the like.

The display 522 may be any suitable display device. The information provided on the display depends on the particular application or applications of the system 500. For example, the display 522 may be used by a parking assistance application.

The microcontroller (MCU) 514 may be a general purpose microcontroller configured to handle system control functions such as steeper motors in real time as well as communication with other modules in the vehicle. The controller area network (CAN) transceiver provides a network protocol for serial communication with various control modules in the vehicle.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein assuming that the number of points per displacement is counted across an entire image. One of ordinary skill in the art will understand embodiments in which the point counting is performed separately for different regions of the images and separate displacement lists are selected for each region. At the next resolution level, each region is searched based on the particular displacements selected for the region. Counting in smaller regions may result in fewer best matches, thus making the search at the next level faster as fewer displacements will need to be searched. The smaller regions may be chosen based on the application. For example, a camera on a car driving forward would have a lot of things moving left on the left half of the image, and a lot of things moving right on the right half of the image. Thus, it may be faster, and probably more accurate, to have a different set of displacements for the left half and right half. Alternately, a top down view of people walking around may have equal numbers of people moving in all directions, though presumably, a single person in a single location would move mostly in one direction.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A computer implemented method for approximate pyramidal search for displacement matching, the method comprising:
    receiving a source image and a destination image;
    performing a complete window-based search at a coarsest resolution level in a resolution pyramid to determine a best matching point in the destination image for each point in the source image, wherein a displacement from each point to the best matching point is determined;
    counting, for each displacement of the determined displacements, a number of points having the displacement;
    selecting displacements from the determined displacements based on the number of points counted for each displacement and a predetermined threshold; and
    performing a search at the next finer resolution level in the resolution pyramid to determine a best matching point in the destination image for each point in the source image, wherein the search for a best matching point for each point is limited to the selected displacements and a reduced search window around each displacement, wherein the selected displacements are upsampled to the next finer resolution level.

2. The method of claim 1, wherein the reduced search window includes only one point in each search direction around a point in the destination image at a displacement.

3. The method of claim 1, wherein the predetermined threshold is an energy percentage indicating a percent of total energy of the determined displacements to select, wherein the energy percentage of a displacement is the number of points having the displacement divided by the total number of points.

4. The method of claim 1, wherein the predetermined threshold is an integer N, where the N displacements having the highest point counts are selected from the determined displacements.

5. An apparatus configured to perform approximate pyramidal search for displacement matching, the apparatus comprising:
    means for receiving a source image and a destination image;
    means for performing a complete window-based search at a coarsest resolution level in a resolution pyramid to determine a best matching point in the destination image for each point in the source image, wherein a displacement from each point to the best matching point is determined;
    means for counting, for each displacement of the determined displacements, a number of points having the displacement;
    means for selecting displacements from the determined displacements based on the number of points counted for each displacement and a predetermined threshold; and
    means for performing a search at the next finer resolution level in the resolution pyramid to determine a best matching point in the destination image for each point in the source image, wherein the search for a best matching point for each point is limited to the selected displacements and a reduced search window around each displacement, wherein the selected displacements are upsampled to the next finer resolution level.

6. The apparatus of claim 5, wherein the reduced search window includes only one point in each search direction around a point in the destination image at a displacement.

7. The apparatus of claim 5, wherein the predetermined threshold is an energy percentage indicating a percent of total energy of the determined displacements to select, wherein the energy percentage of a displacement is the number of points having the displacement divided by the total number of points.

8. The apparatus of claim 5, wherein the predetermined threshold is an integer N, where the N displacements having the highest point counts are selected from the determined displacements.

9. A non-transitory computer readable medium storing software instructions that, when executed by at least one processor, cause the performance of a method for approximate pyramidal search for displacement matching, the method comprising:
    receiving a source image and a destination image;
    performing a complete window-based search at a coarsest resolution level in a resolution pyramid to determine a best matching point in the destination image for each point in the source image, wherein a displacement from each point to the best matching point is determined;

counting, for each displacement of the determined displacements, a number of points having the displacement;

selecting displacements from the determined displacements based on the number of points counted for each displacement and a predetermined threshold; and performing a search at the next finer resolution level in the resolution pyramid to determine a best matching point in the destination image for each point in the source image, wherein the search for a best matching point for each point is limited to the selected displacements and a reduced search window around each displacement, wherein the selected displacements are upsampled to the next finer resolution level.

10. The non-transitory computer readable medium of claim 9, wherein the reduced search window includes only one point in each search direction around a point in the destination image at a displacement.

11. non-transitory computer readable medium of claim 9, wherein the predetermined threshold is an energy percentage indicating a percent of total energy of the determined displacements to select, wherein the energy percentage of a displacement is the number of points having the displacement divided by the total number of points.

12. The non-transitory computer readable medium of claim 9, wherein the predetermined threshold is an integer N, where the N displacements having the highest point counts are selected from the determined displacements.

* * * * *